July 13, 1948.  G. S. YOUNKIN  2,445,255
REGULATING MECHANISM RESPONSIVE TO VARIATIONS
IN DENSITY AND TEMPERATURE OF LIQUIDS
Filed July 4, 1942  3 Sheets-Sheet 1

*INVENTOR.*
GAVIN S. YOUNKIN.
BY
ATTORNEY.

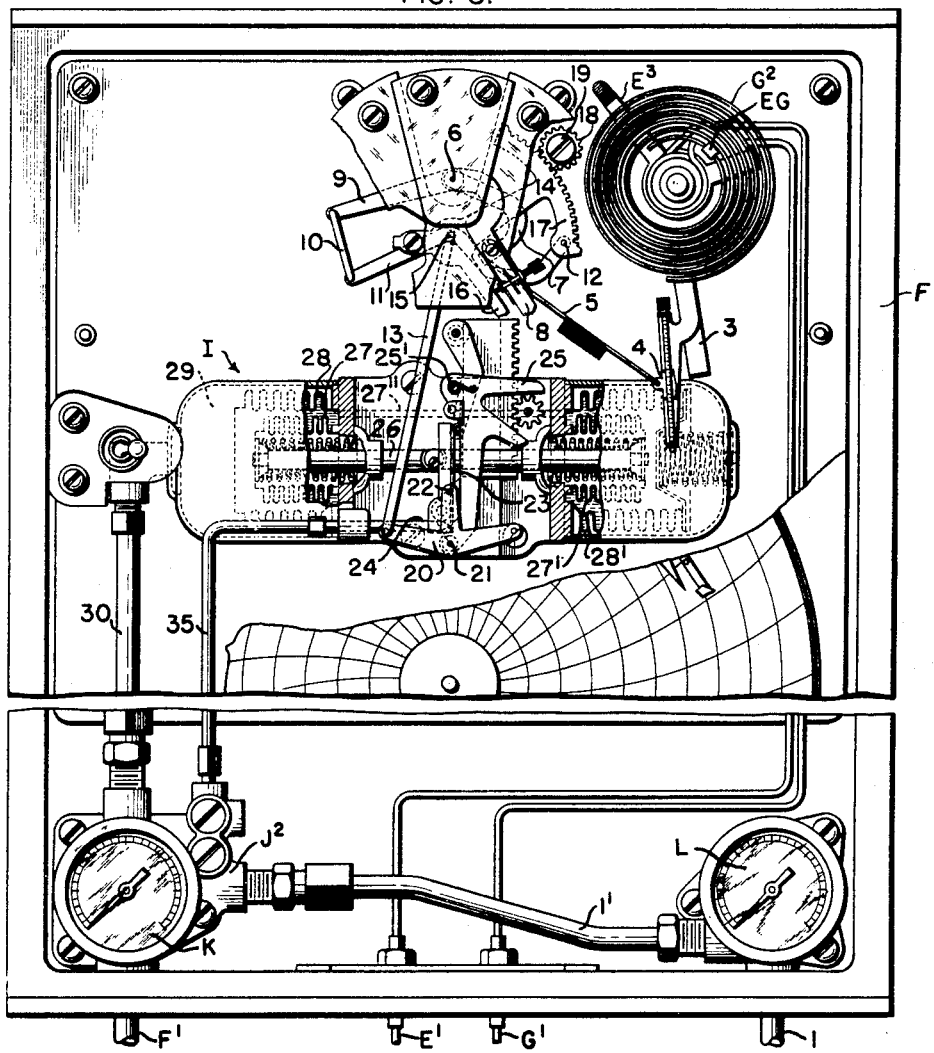
FIG. 3.
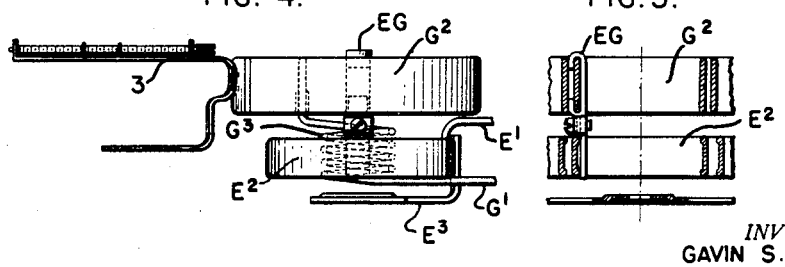
FIG. 4.  FIG. 5.
INVENTOR.
GAVIN S. YOUNKIN
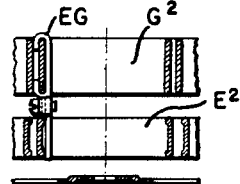
ATTORNEY.

July 13, 1948.  G. S. YOUNKIN  2,445,255
REGULATING MECHANISM RESPONSIVE TO VARIATIONS
IN DENSITY AND TEMPERATURE OF LIQUIDS
Filed July 4, 1942  3 Sheets-Sheet 3

INVENTOR.
GAVIN S. YOUNKIN
BY
C. B. Spangenberg
ATTORNEY.

Patented July 13, 1948

2,445,255

UNITED STATES PATENT OFFICE 2,445,255

REGULATING MECHANISM RESPONSIVE TO VARIATIONS IN DENSITY AND TEMPERATURE OF LIQUIDS

Gavin S. Younkin, Tulsa, Okla., assignor to The Brown Instrument Company, Philadelphia, Pa., a corporation of Pennsylvania Application July 4, 1942, Serial No. 449,836

4 Claims. (Cl. 202—160)

The general object of the present invention is to provide simple and effective means for creating control effects on and in response to variations in the density of a liquid. More specifically, the object of the present invention is to provide simple and effective means for maintaining a pneumatic control force varying in a predetermined manner with the density at a predetermined or base temperature of a liquid which varies in temperature.

In the preferred embodiment of the present invention, I associate liquid weighing means with a pneumatic transmitter of known type so that the latter will maintain an air pressure varying with the weight of a given volume of the liquid, and I combine said weighing means and transmitter with a thermometer creating a fluid pressure proportional to the temperature of the liquid and with a so called air controller in such manner that the air controller will maintain a control air pressure varying in accordance with changes in the density which the liquid weighed, has, or would have at a predetermined base temperature.

The pneumatic transmitter, thermometer and air controller which are combined as above described, may each be of a simple and effective commercial type. The liquid weighing means employed may take various forms. In a simple and preferred form it comprises means for measuring the flotative force of the liquid on a float. Advantageously, the float is entirely immersed in the liquid and is moved to definitely different levels on given changes in the weight of the liquid under the control of a spring or analogous loading force which yieldingly opposes the up or down movement of the float, accordingly as the specific gravity of the latter is less than or exceeds the specific gravity of the liquid.

The invention may be used for a wide variety of purposes, and is of especial utility in distilling, rectifying and refining operations. It may be used to advantage, for example, in producing alcohol of given proof; in regulating the return of reflux liquid to a distilling column to thereby control the character of the vapor leaving the column; and in blending operations as in the production of a combustible liquid of predetermined density by mixing a liquid of lesser density with a liquid of greater density.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 3 is an elevation with parts broken away and in section of a control instrument included in the apparatus shown in Figs. 1 and 2;

Fig. 4 is a side view of a differential pressure element of the instrument shown in Fig. 3;

Fig. 5 is a partial section of the apparatus shown in Fig. 4;

Figure 1:
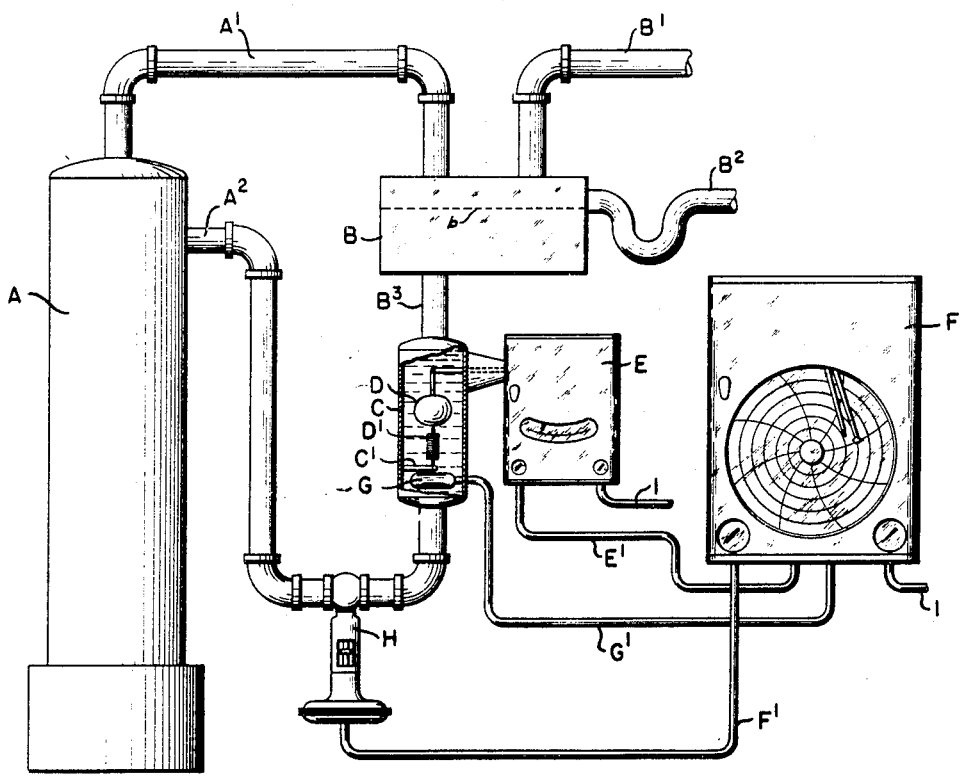
Fig. 1 is a diagrammatic view illustrating apparatus for controlling the character of the vapor discharged from a distilling column.

In Fig. 1 I have diagrammatically illustrated an embodiment of my invention in apparatus comprising a distilling column A having a vapor outlet $A^1$ and a reflux liquid inlet $A^2$. The vapor outlet $A^1$ leads to a condenser B having a vapor outlet $B'$, and a liquid overflow outlet $B^2$ which maintains a normal condensate liquid level $b$ in the condenser, and also having a second condensate outlet $B^3$, which supplies condensate to a density measuring chamber C and for reflux purposes. In the form shown the chamber C is below the liquid level $b$ and is entirely filled with liquid in normal operation.

In the particular arrangement shown in Fig. 1, the weighing apparatus employed to determine the specific gravity of the liquid in the chamber C comprises a float D submerged in the liquid in the chamber C and weighing less than the liquid which it displaces at all normal operating temperatures of the liquid. A spring $D'$ yieldingly opposes the tendency of the float D to move upward in the liquid in which it is immersed. As shown the spring $D'$ has its upper end connected to the float D and has its lower end connected to an abutment arm $C'$ carried by the wall of the chamber C. As will be understood, the spring connection between the float D and vessel C may be made adjustable for calibration purposes. With the arrangement shown in Fig. 1 the vertical position of the float D varies with the weight of the liquid displaced, the spring D' elongating and contracting as required to make its tension equal to the difference between the weight of the float and the weight of the liquid which the float displaces.

As shown in Figs. 3, 4 and 5, the instrument F is responsive to a differential effect of the air pressure transmitted to it by the transmitter E through the pipe E', and of the thermometer pressure transmitted to it through a capillary pipe $G^1$ from the fluid pressure thermometer bulb G immersed in the liquid in the chamber C. To this end two coaxial spiral Bourdon tube elements $E^2$ and $G^2$ are mounted in the instrument F and connected to the pipes $E^1$ and $G^1$, respectively. As shown, the Bourdon tube $E^2$ has its outer end soldered or otherwise secured to a part $E^3$ which is secured to the casing of the instrument F. A bar like part EG rigidly connects the movable inner end of the Bourdon tube $E^2$ to the inner end of the Bourdon tube $G^2$. The tube $G^2$ is thus supported by the part EG and is bodily moved clockwise or counter-clockwise by the corresponding movements of the inner end of the tube $E^2$. To prevent the capillary tube connection G' to the spiral tube $G^2$ from interfering with the movement of the free end of the spiral tube $E^2$ in response to the changes in the thermometer pressure, the tube G' may advantageously be formed with a helical spring portion $G^3$ coaxial with the Bourdon spirals.

The control air pressure established by the instrument F as hereinafter described, is transmitted through the pipe F' to a fluid pressure control valve H regulating the passage of reflux liquid from the condenser B into the upper portion of the column A through its inlet $A^2$. As diagrammatically shown, the inlet pipe $A^2$ receives reflux liquid directly through the chamber C. However, the latter may well form a by-pass to the main path of reflux liquid flow to the column A, so that said flow will not tend to disturb the level of the float D. Some liquid flow through the vessel C is desirable, however, to avoid differences in composition and density between the liquid bodies in the condenser B and vessel C.

As shown, the Bourdon spiral tubes $E^2$ and $G^2$ are both wound in the same direction and the transmitter E is arranged to increase or decrease the pressure in its pipe E' accordingly as the float moves down or up. In consequence, the inner end of the spiral tube $E^2$, which has its outer end fixed, is moved and bodily moves the Bourdon tube $G^2$ in the counter-clockwise or clockwise direction accordingly as the float D rises or falls, respectively. The outer end of the Bourdon tube $G^2$ will move relatively to its inner end in the clockwise or counter-clockwise direction as the temperature in the vessel C decreases or increases.

As a result, rising or falling movement of the float D solely due to a decrease or increase in the temperature of the liquid in the chamber C, is prevented from having any effect on the control pressure in the transmission pipe F' of the instrument F, by the Bourdon tube $G^2$ which neutralizes the tendency of the Bourdon tube $E^2$ to then modify said pressure.

The means by which the pressure transmitted from the instrument F by the pipe F' is regulated, comprises an arm 3 secured to the outer end of the Bourdon tube $G^2$, and carrying a connection part 4, which for calibration purposes is adjustable on said arm toward and away from the axis of the Bourdon spirals $G^2$ and $E^2$. The angular movements of the arm 3 give corresponding angular movements to an exhibiting element comprising a pen shaft 6 through a link 5 which is connected at one end to the connection part 4, and is connected at its other end to an arm 7 secured to said shaft 6. The exhibiting element also includes a pen arm 8 and a controller actuating arm 9, both secured to the pen shaft 6.

The arm 9 is connected by a link 10 to one end of a lever 11 which is journalled at its opposite end on an adjustable fulcrum pin 12. Intermediate its ends the lever 11 is pivotally connected to one end of a link 13, which is connected to, and forms the actuating element of a pneumatic control unit I included in the instrument F. The pivot 12 is supported by a control point adjusting element 14 which is pivotally connected through a pivot 15 to the framework of the instrument A and includes a control point index arm 16. The member 14 includes a gear segment 17 in mesh with a spur gear 18 carried by the shaft of a knob 19 which may be manually rotated to thereby turn the member 14 about the axis of its pivot 15. The resultant adjustment of the pivot 12 is through a range in which it acts through the lever 11 to give the link 13 an adjustment in the general direction of its length, and thereby adjusts the "control point," or relation between the position of the arm 3 and the adjustment of the valve H which the control instrument F maintains.

Preferably, and as shown, the control unit I is of a well known commercial type disclosed in the Moore Patent 2,125,081, granted July 26, 1938, and including a lever 20 journalled on a pivot 21 and having an arm connected to the lever 11 by the link 13. Another arm of the lever 20 carries a flapper lifting pin 22. The latter, on a clockwise adjustment of the lever 20, moves a flapper valve 23 away from a cooperating bleed nozzle element 24, and thus reduces the throttling effect of the flapper 23 on the outflow of air through the bleed orifice or passage through the nozzle 24. The flapper 23 is biased for movement toward the nozzle 24.

A change in the nozzle pressure produced through the flapper 23 by an initial angular adjustment of the lever 20 about its pivot 21, results in a prompt follow-up adjustment of the flapper 23 in the reverse direction, and may give rise to a delayed compensating or resetting adjustment of the flapper 23 in the same direction as the initial adjustment. The follow-up and compensating adjustments of the flapper are directly due to angular adjustments of a lever 25 which carries the pivot pin 21 and is pivotally supported by a pivot pin 25'. A rod 26 which connects the movable ends of opposed inner belows members 27 and 27' acts on the lever 25 to give the latter angular adjustments when the rod is given a longitudinal movement in one direction or the other. Each of the elements 27 and 27' is located in a liquid filled space within a corresponding outer bellows elements 28 and 28', respectively. The liquid filled space between the bellows elements 27 and 28 is connected to the liquid filled space between the bellows elements 27' and 28', by a restricted passage through a connecting pipe 27''.

The bellows system is subjected to resilient forces tending to elongate the bellows 28, and, as hereinafter explained, the effect of an increase or decrease in the pressure within the nozzle 24 is to respectively increase or decrease the pressure in the chamber 29 in which the bellows 28 is located.

Such increase or decrease in the pressure acts externally on the bellows element 28, and effects a contraction or elongation of the latter. Such contraction or elongation of the bellows 28 acts through the liquid in the space between the bellows element 27 and 28 to contact or elongate the bellows 27, and thereby effects a corresponding counter-clockwise or clockwise adjustment of the lever 25, and a result follow-up adjustment of the flapper 23.

The contraction or elongation of the inner bellows 27 is opposed by resilient forces acting on the inner bellows elements 27 and 27' and results in a relatively slow transfer of liquid through the pipe 27'' which permits the bellows elements 27 and 27' to slowly return to their normal lengths. This slow return to normal length of the bellows elements 27 and 27' effects a compensating or resetting adjustment of the flapper 23 by adjusting the lever 25 in an angular direction opposite to that of the preceding follow-up adjustment of said lever. As shown, the pressure acting externally on the bellows element 28 is transmitted by a pipe 30 to the chamber 29 of the unit I from the control pressure chamber 31 of a booster valve J. The latter is advantageously of the commercial form and type shown in Fig. 6. The previously mentioned pipe F' transmits the control pressure from the chamber 31 of the valve J of instrument F to the pressure chamber of the control valve H. Further description of the details of the control unit F, including the mechanical connection between the rod 26 and the lever 25 and the provisions through which the throttling range of the control unit may be adjusted, is unnecessary, since such details form no part of the present invention, and are in extensive use and well known, and are fully described, moreover, in said Patent No. 2,125,081.

Figure 6:
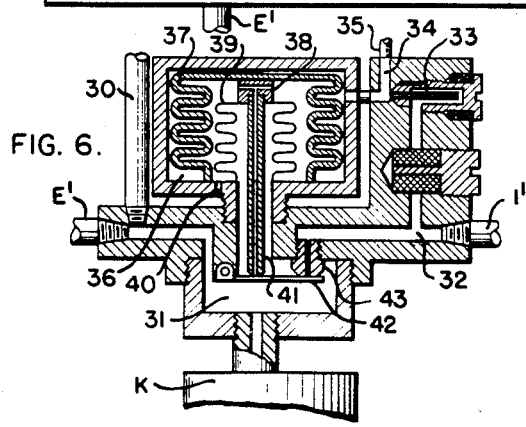
Fig. 6 is a section through a booster valve included in the instruments shown in Figs. 3 and 7.

As shown, the booster valve J comprises a casing structure formed with a channel 32 which receives air at approximately constant pressure through a branch 1' from a supply system 1. The receiving channel 32 is connected by a restricted passage formed by the bore of a capillary tube 33, to a second channel 34 formed in the booster valve casing. As shown in Figs. 3 and 6, the booster valve channel 34 is connected by a pipe 35 to the nozzle 24, and the pressure in the chamber 34 is the nozzle pressure, which increases and decreases as the flapper 23 is adjusted to make the rate at which air leaks, or bleeds, to the atmosphere through the nozzle 24, greater or less than the rate of flow through the restricted passage 33.

The booster valve channel 34 is in free communication with the chamber 36 formed in the casing of the booster valve and inclosing a bellows 37, which is thus subjected externally to the pressure in the nozzle 24. The bellows 37 is rigidly connected at its lower end to the bottom wall of the booster valve chamber 36 and has its upper end closed and mechanically connected through a part 38 to the closed upper end of a smaller bellows element 39 located within the bellows 37 and having its lower end rigidly connected to the bottom wall of the chamber 36. The interior of the bellows 39 is in free communication with the control pressure chamber 31 and the space between the bellows 37 and bellows 39 is in free communication with the atmosphere through a port 40 formed in the bottom wall of the chamber 36.

The booster valve J operates to maintain a control pressure in the chamber 31 which is in a proportion to the nozzle pressure in the chamber 36, equal to the proportion of the maximum cross sectional area of the bellows 37 to the maximum cross sectional area of the bellows 39. On an increase in the nozzle pressure acting on the bellows 37, the latter contracts and through a tubular stem 41 having its upper end connected to the upper end of the bellows 37 through the connection part 38, a flapper valve 42 is moved away from its normal position in which it engages the nozzle 43 and opens the axial passage through said nozzle. When the flapper 42 is thus moved away from the nozzle 43, air flows through the latter from the channel 32 into the chamber 31, until the pressure in the latter is increased sufficiently to restore the normal ratio between that pressure and the nozzle pressure in the chamber 36, and thereby expands the bellows 39 and 37 sufficiently to permit the flapper 42 to again close the passage through the nozzle 43.

Conversely, on a decrease in the nozzle pressure transmitted to the chamber 36, the bellows elements 37 and 39 elongate and the tubular stem 41 has its lower end moved out of engagement with the flapper valve 42. This permits air to escape from the chamber 31 through the bore of the stem 41 and a channel in the connection part 38 through which the upper end of said bore is in communication with the space between the bellows elements 37 and 39. As previously stated, that space is in free communication with the atmosphere through the port 40 in the bottom wall of the chamber 36.

Customarily, and as shown, each of the instruments F and E includes pressure gauges K and L which respectively indicate the control pressure in the corresponding booster valve chamber 31, and the air supply pressure transmitted through the pipe 1' to the booster valve channel 32.

In normal operation an increase in the weight of the liquid displaced by the float D results in counter-clockwise adjustments of the arms 3, 7, 8 and 9 of the instrument F. The counter-clockwise adjustment of the arm 9 operates through the link 10, lever 11, link 13, lever 20 and pin 22 to permit the flapper 23 to move closer to the nozzle 24 and thus increase the nozzle pressure transmitted to the chamber 36 of the booster valve J of the instrument F. As previously explained, an increase in the nozzle pressure acting on the bellows 37 increases the control pressure which is transmitted from the booster valve member 31 through the pipe F' to the control valve H and which is transmitted through the conduit 30 to the chamber 29 of the control instrument F.

As has also been previously explained, an increase in the pressure acting on the outer side of the bellows 28 results in a prompt movement to the right of the connecting rod 26, which thereby gives a counter-clockwise adjustment to the lever 25. The resultant bodily movement of the lever 20 gives a follow-up adjustment to the flapper 23 away from the nozzle 24, and thus eliminates a portion of the nozzle pressure increase produced by the preceding counter-clockwise adjustment of the lever 20. The condition giving rise to the follow-up adjustment to the right of the connecting rod 26 increases the liquid pressure within the bellows 28 relative to the liquid pressure within the bellows 28', and results in a slow flow of liquid through the restricted pipe 27'' and a slow movement to the left of the connecting rod 26. Such movement of the rod 26 produces a compensating or resetting adjustment of the flapper 23 toward the nozzle 24, and thereby neutralizes or tends to neutralize the effect of the preceding follow-up adjustment.

Conversely, on a decrease in the weight of the float displaced liquid, the clockwise adjustment of the arm 3 results in an initial adjustment of the flapper 23 away from the nozzle 24, and a consequent decrease in the control pressure maintained in the booster valve chamber 31. The decrease in the control pressure results in a follow-up adjustment of the flapper 23 toward the nozzle 24, and tends to produce a subsequent compensating adjustment of the flapper away from the nozzle. As will be understood, whether each follow-up adjustment will be directly followed and neutralized by a compensating or resetting adjustment, depends upon whether the differential effect of the pressures transmitted to the Bourdon tubes $E^2$ and $G^2$ remains constant or varies during the period required for the completion of such compensating or reset adjustment.

An increase or decrease in the pressure transmitted to the control chamber of the control valve H gives a corresponding adjustment to the latter, and thereby tends to maintain a vapor discharge through the column outlet A' which will result in the desired density of the condensate formed in the condenser B.

Figure 7:
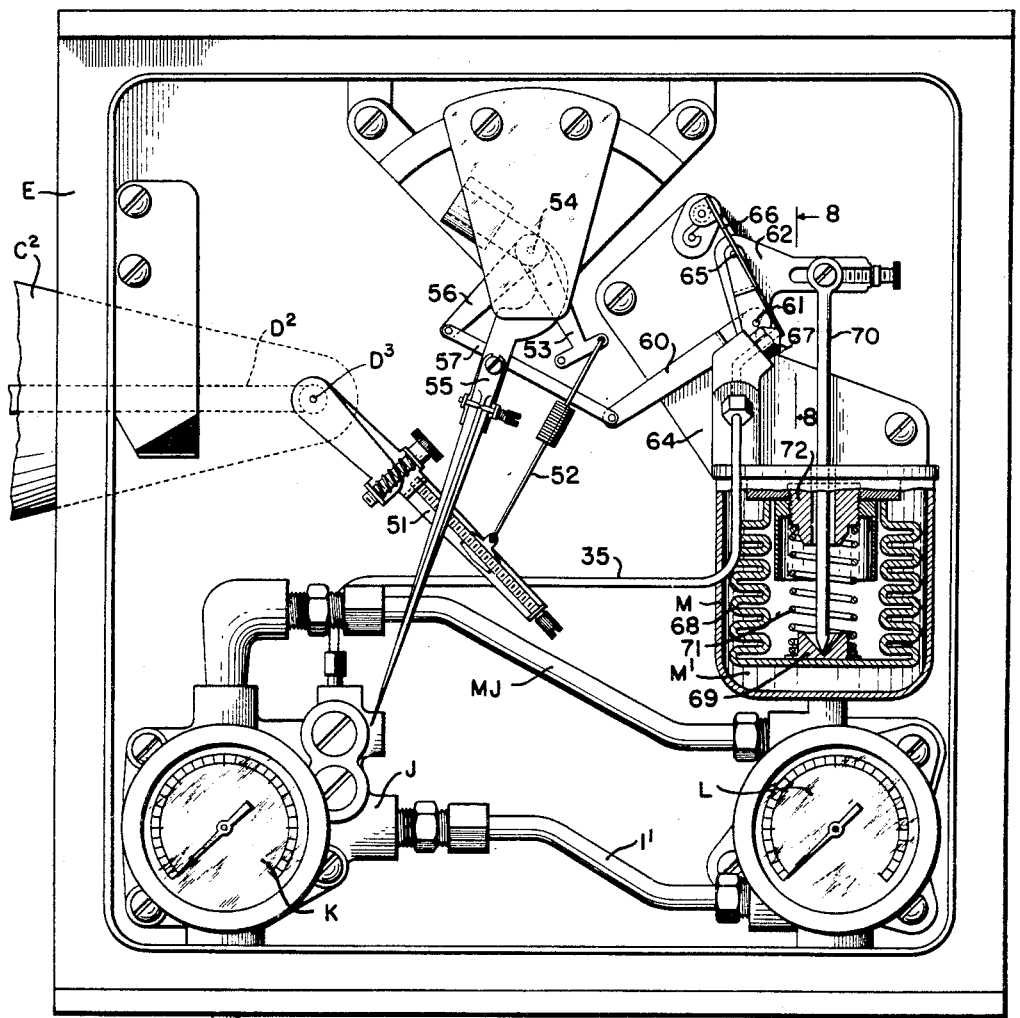
Fig. 7 is a sectional elevation of a measuring transmitter instrument included in the apparatus shown in Figs. 1 and 2.

As shown in Fig. 7, the transmitter E comprises an arm 51 carried by the float actuated shaft $D^3$. The arm 51 is adjustably connected to one end of a link 52 which has its other end connected to the arm 53 of an exhibiting element connected to the casing of the transmitter E by a pivot 54. Said exhibiting element includes an exhibiting arm 55, shown as a simple indicating pointer, and includes another arm 56, which is connected by a link 57 to one arm of a bell crank lever 60.

Figure 8:
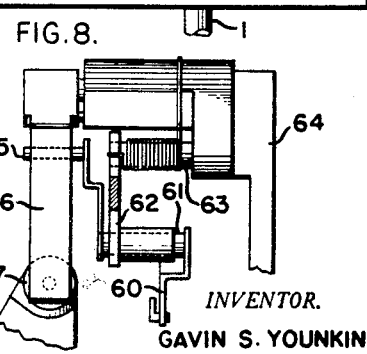
Fig. 8 is a partial section on the line 8—8 of Fig. 7.

The lever 60 forms the primary actuator of a transmission bellows device M included in the transmitter E. The lever 60 is connected by a pivot 61 to one arm of a second bell crank lever 62, and the latter is connected by a pivot 63 (see Fig. 8) to a bracket portion 64 of the casing of the element M. The lever 60 carries a flapper lifting pin 65 which on a clockwise adjustment of the lever 60 moves a flapper valve 66 away from a bleed nozzle 67 mounted on the casing of the element M and connected through a pipe 35 to the channel 34 of a booster valve J included in the transmitter B in the same manner in which the previously mentioned booster valve J is included in the instrument F. The pressure chamber of the booster valve J of Fig. 7 is connected by a pipe MJ to the bellows chamber M' of the transmission bellows element M.

The pressure thus transmitted to the chamber M' subjects a bellows 68 therein to a bellows contracting force. The bellows 68 has its upper end rigidly connected to the top wall of the chamber M'. The closed movable bottom wall of the bellows 68 is provided in its inner side with a conical seat 69 for the lower end of a bellows rod 70, which is adjustably connected at its upper end to one arm of the bell crank lever 62. A compression spring 71 acting between the bottom wall of the bellows 68 and an abutment 72 opposes the contraction of the bellows. The abutment 72 is in the form of a tubular nut mounted in a threaded opening in the top wall of the chamber M', so that the rotation of the abutment will vary the length to which the bellows 68 is contracted by a given pressure transmitted to the chamber M' through the pipe MJ. The bore of the tubular nut 72 is substantially larger than the diameter of the bellows rod 70 so that the upper end of the latter may be adjusted transversely to the axis of the bellows.

In operation, with the float D at any particular level, the exhibiting element arms 55 and 56 will occupy corresponding positions. The adjustment of the arm 56 into any particular position results in the establishment of corresponding nozzle and control pressures in the valve channel 34 and control pressure chamber 31 respectively, of the booster valve J of the transmitter E.

While the ultimate effect of a change in the position of the arm 56 of the transmitter E is thus to produce definite corresponding changes in the nozzle and control pressures, the initial effect of a change in position in the arm 56 is to produce an adjustment of the flapper 66 greater than is required to maintain the nozzle and control pressures ultimately established. The over adjustment of the flapper 66 initially effected by a change in the position of the arm 56 is corrected by the transmission bellows element M' which readjusts the flapper into its final position. Thus, for example, on a down movement of the float D, the resultant counterclockwise adjustments of the arm 56, bell crank lever 60 and flapper lifter pin 65 of transmitter E, result in a movement of the flapper 66 toward the nozzle 67, sufficient to increase the pressure in the nozzle 67 at a desirably rapid rate. As the pressure in the nozzle 67 builds up, a corresponding increase is made in the control pressure transmitted by the pipe MJ from the associated booster valve J to the chamber M' of the transmission bellows device M. As the pressure increases in the chamber M', the bellows 68 contracts and through the bellows rod 70 and bell crank lever 62 adjusts the pivot pin 61 for the lever 60, and thereby adjusts the flapper lifter pin 65 in the direction to move the flapper 66 away from the nozzle 67. The corrective adjustment of the flapper effected by the device M continues until the nozzle pressure and the control pressure are stabilized at the particular respective pressures in which each is in its predetermined relation with the position occupied by the exhibiting element arm 56.

Operative results which are the contrary of those just described are produced when the float D moves upward, the pressure transmitted by the pipe E' thus increasing and decreasing as the float D moves down and up, respectively.

The general operation of the apparatus shown in Figs. 1 and 3–7 will be apparent from the foregoing description and may be summarized as follows:

As the weight per unit volume of the liquid in the chamber C increases and decreases, the float D moves up and down, respectively. The up and down movements of the float D causes the transmitter E to respectively decrease and increase the pressure transmitted by the pipe E' to the control instrument F. The thermometer pressure transmitted to the instrument F from the thermometer bulb G increases and decreases as the temperature of the liquid in the chamber C increases and decreases.

The weight per unit volume of a liquid may change as the result of a change in the liquid composition, and may increase or decrease as a result of decreases and increases in the temperature of the liquid within the normal liquid temperature range. For many purposes, it is important to determine the liquid weight changes due solely to changes in liquid composition; i. e. the change in the density of the liquid which would be produced by a change in its composition occurring with the liquid maintained at a constant base temperature, for example, at a temperature of 70° F.

The apparatus described is adapted to determine the density of a liquid at a predetermined base temperature. The Bourdon tubes $E^2$ and $G^2$ similarly wound and suitably proportioned and connected as described, cooperate to neutralize the effect of a change in the weight of the liquid displaced by the float D which is wholly due to a change in the temperature in that liquid. In consequence, the pressure transmitted from the instrument F through its pipe F' to the fluid pressure motor valve H increases and decreases in proportion to the changes in the density which the liquid would have if kept at a predetermined constant temperature, for example, at a temperature of 70° F.

In the apparatus shown in Fig. 1, the valve H may be arranged to be given either a closing adjustment or an opening adjustment by an increase in the pressure transmitted to it by the pipe F', as conditions make desirable. In most, at least, of the distilling operations in which use may advantageously be made of the present invention an increase or decrease in the rate at which reflux liquid is returned to the distilling column will respectively decrease or increase the density of the condensate formed in the condenser B, and in such case, the valve H should be arranged to be given opening and closing adjustments on increases and decreases, respectively, in the density of the condensate and in the pressure transmitted to the value H by the control instrument F.

Aside from its automatic compensation for the effects of changes in liquid temperature, the apparatus shown diagrammatically in Fig. 1 has other practical advantages. The float chamber C may be made quite small and compact in comparison with the liquid containers of liquid density measuring apparatus heretofore in common use. Moreover, the chamber C encloses the liquid passing through it and thus protects the liquid from air contamination and avoids evaporation of the liquid into the atmosphere. The apparatus also possesses the inherent and practically important advantage that by suitable float design and by suitable regulation of the rate of flow through the float chamber C, the time lag in the determination of the density of the condensate formed in the condenser B can be made as small as is practically desirable. Furthermore, by the use of a suitable float and float loading arrangement, the float movement may be made as great as is required for the maximum throttling control range, which is practically desirable, without objectionable increase in the dimensions of the float chamber.

Figure 2:
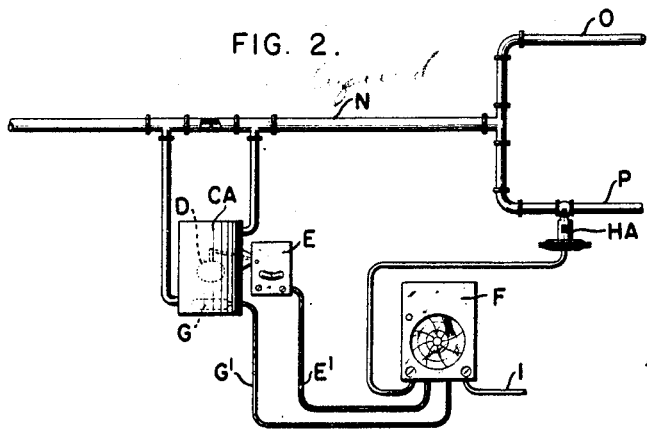
Fig. 2 is a diagrammatic view illustrating apparatus for controlling the density of a blended liquid.

As previously explained, the general principles of the present invention may be used for a wide variety of purposes, and in Fig. 2 I have illustrated, by way of example, an arrangement in which a blended liquid flowing through a pipe N is formed and maintained at a predetermined density by mixing a liquid of greater density than the liquid in pipe N supplied by the pipe O, with an automatically regulated amount of liquid supplied through a pipe P, and of lesser density than the liquid in the pipe N. As diagrammatically shown in Fig. 2, a float chamber CA is connected to the pipe N to form a by-pass about a portion of the pipe N in which there is a sufficient pressure drop to insure a suitable rate of flow of liquid through the chamber CA. The chamber CA includes a float D and thermometer bulb G associated with instruments E and F as are the float D and bulb G in the previously described float chamber C. The regulating valve HA, to which a control pressure is transmitted by the pipe F' leading from the instrument of Fig. 2, is arranged to open and close, and thereby respectively decrease or increase the amount of lighter liquid supplied by the pipe P which is mixed with the heavier liquid supplied by the pipe O, when the density of the liquid passing through the pipe N and its by-pass including the chamber CA, decreases below or increases above the desired value.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent is:

1. Regulating mechanism for maintaining an air pressure varying in accordance with changes in the density of a liquid which are independent of the temperature of the liquid flowing through a container; comprising in combination with said container, a float immersed in the liquid in said container and subject to a floatative force by said liquid, float loading means adjusting said float to levels varying on and in accordance with changes in the weight of the liquid displaced by said float, a pressure transmitting instrument including an expansible and collapsible vessel and means for maintaining a measuring air pressure in said vessel varying with changes in the density of said liquid comprising a bleed nozzle and valve, an operating connection between said float and valve moving said valve toward and away from said nozzle to decrease and increase the pressure in said vessel in respective accordance with a change in the level of said float in one direction or the other, an operating connection between said valve and said vessel through which the expansion and contraction of said vessel moves said valve toward and away from said nozzle as the pressure in said vessel respectively increases and decreases, an air control instrument of the known type comprising a bleed orifice flapper valve for maintaining a regulating air pressure dependent on the adjustment of said flapper valve, a follow-up and resetting mechanism to which said regulating pressure is transmitted, an operating connection through which said mechanism gives follow-up and resetting adjustments to said flapper valve on changes in the pressure transmitted to the mechanism, and means for giving said flapper valve control adjustments on changes in the density and temperature of the liquid flowing through said container comprising two expansible chambers mechanically connected to said control flapper so that each tends to adjust the latter in one direction or the other on an increase or decrease in the pressure in the chamber, a fluid pressure thermometer bulb responsive to the temperature of the liquid in said container and maintaining a fluid pressure varying with said temperature, and means for transmitting the last mentioned pressure to one of said chambers, and means for transmitting said measuring pressure to the second of said chambers.

2. Regulating mechanism as specified in claim 1, in which each of said expansible chambers is in the form of a Bourdon tube, one of said tubes having one end stationary and having its second end connected to one end of the other Bourdon tube and the last mentioned tube having its second end connected to said flapper valve.

3. Regulating mechanism for maintianing an air pressure varying in accordance with changes in the density of liquid flowing through a container comprising in combination with said container, a float immersed in the liquid in said container and subject to a floatative force by said liquid, float loading means adjusting said float to levels varying on and in accordance with changes in the weight of the liquid displaced by said float, a pressure transmitting instrument including an expansible and collapsible vessel and means for maintaining a measuring air pressure in said vessel varying with changes in the density of said liquid comprising a bleed nozzle and valve, an operating connection between said float and valve moving said valve toward and away from said nozzle to decrease and increase the pressure in said vessel in respective accordance with a change in the level of said float in one direction or the other, an operating connection between said valve and said vessel through which the expansion and contraction of said vessel moves said valve toward and away from said nozzle as the pressure in said vessel respectively increases and decreases, an air control instrument of the known type comprising a bleed orifice and flapper valve for maintaining a regulating air pressure dependent on the adjustment of said flapper valve, a follow-up and resetting mechanism to which said regulating pressure is transmitted, an operating connection through which said mechanism gives follow-up and resetting adjustments to said flapper valve on changes in the pressure transmitted to the mechanism, and means for giving said flapper valve control adjustments on changes in the density and temperature of the liquid flowing through said container comprising two expansible chambers mechanically connected to said control flapper so that each tends to adjust the latter in one direction or the other on an increase or decrease in the pressure in the chamber, a fluid pressure thermometer bulb responsive to the temperature of the liquid in said container for maintaining a fluid pressure varying with said temperature, means for transmitting the last mentioned pressure to one of said chambers, means for transmitting said measuring pressure to the second of said chambers, and means actuated by variations in said regulating air pressure to modify the composition of said liquid in a manner tending to maintain the density of said liquid constant when said liquid is at a predetermined tempertaure.

4. Regulating mechanism as specified in claim 1, including means responsive to the regulating air pressure maintained by the air control instrument for varying the composition of said liquid to thereby increase or decrease the density of the liquid on a decrease or increase, respectively, in said air pressure as required to maintain the density of the liquid at a predetermined temperature substantially constant.

GAVIN S. YOUNKIN.

REFERENCES CITED

The following references are of record in the file of this patent:

UNITED STATES PATENTS

| Number | Name | Date |
| --- | --- | --- |
| 1,604,387 | Caldwell | Oct. 26, 1926 |
| 1,660,503 | Greenfield | Feb. 28, 1928 |
| 1,770,559 | Taylor | July 15, 1930 |
| 1,909,469 | Hubbard | May 16, 1933 |
| 1,944,243 | Kegl | Jan. 23, 1934 |
| 2,086,808 | Kallam | July 13, 1937 |
| 2,217,637 | Junkins | Oct. 8, 1940 |
| 2,217,642 | Luhrs | Oct. 8, 1940 |
| 2,236,035 | Luhrs | Mar. 25, 1941 |
| 2,248,322 | Annin | July 8, 1941 |
| 2,251,771 | Wynn et al. | Aug. 5, 1941 |
| 2,273,103 | Harrison | Feb. 17, 1942 |
| 2,297,098 | Carney | Sept. 29, 1942 |
| 2,303,891 | Moore | Dec. 1, 1942 |
| 2,309,415 | Pearson et al. | Jan. 26, 1943 |
| 2,317,701 | Ullman | Apr. 27, 1943 |
| 2,381,948 | Gess | Aug. 14, 1945 |

FOREIGN PATENTS

| Number | Country | Date |
| --- | --- | --- |
| 839,703 | France | Jan. 7, 1939 |
| 446,069 | Great Britain | Apr. 23, 1936 |